C. ELLIS.
PROCESS OF HYDROGENATION.
APPLICATION FILED MAR. 29, 1912. RENEWED SEPT. 11, 1916.
1,217,118.                                    Patented Feb. 20, 1917.
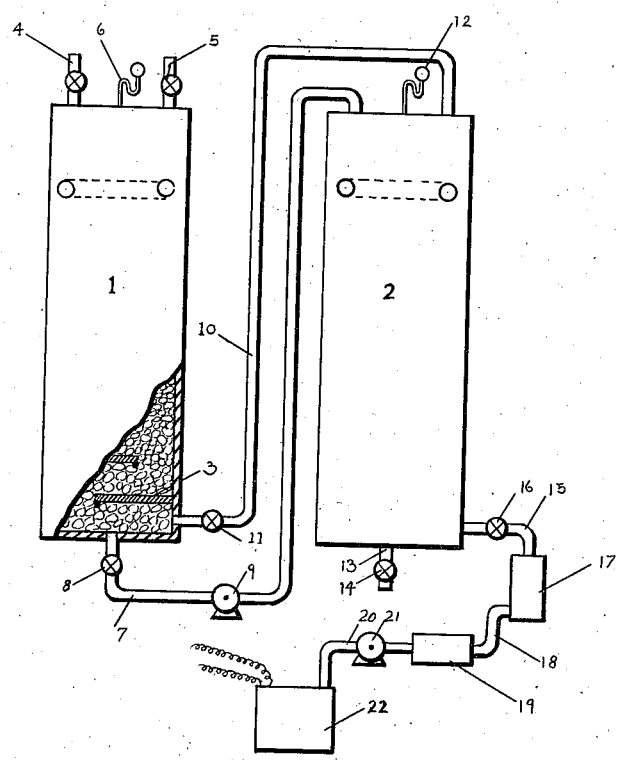
WITNESSES:                                      INVENTOR

UNITED STATES PATENT OFFICE.

CARLETON ELLIS, OF MONTCLAIR, NEW JERSEY.

PROCESS OF HYDROGENATION.

1,217,118.  Specification of Letters Patent.  Patented Feb. 20, 1917.

Application filed March 29, 1912, Serial No. 686,988.  Renewed September 11, 1916.  Serial No. 119,408.

*To all whom it may concern:*

Be it known that I, CARLETON ELLIS, a citizen of the United States, and a resident of Montclair, in the county of Essex and State of New Jersey, have invented certain new and useful Improvements in Processes of Hydrogenation, of which the following is a specification.

This invention relates to a process of treating organic materials, especially unsaturated fats, fatty acids and glycerids and similar material, by means of hydrogen or hydrogen-yielding material, for the purpose of saturating such unsaturated bodies to a greater or less extent.

This application is a division of my former co-pending application, Serial No. 656,100, filed October 23, 1911, now Letters Patent No. 1,026,156 especially as regards oil colloids or colloidal catalyzers, as well as those catalyzers formed, for example, *in situ* by thermal decomposition. This application also contains matter derived from Serial No. 679,771 filed February 24, 1912, especially as regards the use of carbonaceous material in catalytic processes.

Among the materials which may be treated in accordance with my invention are fatty acids as oleic or linoleic acids, or fatty acid mixtures, also glycerids as oleins and linoleins including glycerids such as cottonseed, castor, linseed, Chinese wood, Perilla, soy bean, corn, peanut, and fish oils.

The process of saturation is carried out with the aid of catalytic material including such catalysts as cobalt, nickel, copper, iron, palladium and platinum; also under certain circumstances chromium, manganese, titanium, molybdenum, vanadium, thorium, zirconium, selenium, and tellurium preferably in a finely divided state; in so far as these may be adapted as hydrogenating catalysts under the particular conditions imposed. Likewise under certain circumstances these elements may be employed in the form of their oxids, carbids, silicids, etc. Other compounds of silica are somewhat useful, especially colloidal silica and nickel in admixture or combination. Carbon in its various forms and particularly charcoal may be used.

The fatty material and the like may carry catalytic material such as the bodies above mentioned, which, if desired, may be employed in an oil soluble or in a colloidal form. Metallo-organic compounds more or less soluble in oil and consisting of or containing a metal united to an organic radical such as the weak organic acid, as, for example, oleic acid, are useful to this end; especially as by properly regulating conditions, such as, the temperature, these metallo-organic compounds may be decomposed in a predetermined manner, setting free the catalyst, not necessarily as a pulverulent catalyzer in the ordinary sense of the term, but as an "oil-colloid" in a state of extreme subdivision, and often colloidally dissolved or existing more or less in a state of quasi-solution wonderfully conducive to accelerated hydrogen absorption by the fatty material and the like.

When such an oil colloid is to be produced by heating an oil soluble metallo-organic compound to the requisite temperature, the selection of the metallo-organic compound preferably applied, should be made with particular reference to the hydrogen absorptive properties, thermally considered, of the oil to be treated.

The conversion of oleic acid, using the various commercial forms, *e. g.* red oil, elain oil, distilled fatty acids from various animal and vegetable oils, recovered oils of textile mills and the like, into stearic acid by the present process is most effective, ordinarily, in the presence of a colloidal catalyst or oil-colloid.

When, in the presence of an acid body a metallic catalyzer tends to form a metallic soap, I may heat the material at the time of hydrogenation to a temperature above which the soap cannot exist as such, or if formed, immediately decomposes so that the catalyzer does not enter into solution to any undesired extent. By holding the material at a temperature about 10° C. above the decomposition point, undesirable formation of metallic soaps or metallo-organic bodies is prevented. This temperature, moreover, varies with the organic body under treatment, and preferably is determined by forming in any suitable manner the metallo-organic compound and then gradually heating until the decomposition point is reached. This temperature may thus establish the conditions governing the procedure with respect to the material in hand.

As an illustrative example, a metallo-organic compound such as nickel oleate may be heated with an oil such for instance as cottonseed oil preferably employing only a few per cent. of the nickel compound and the temperature is maintained at about 200° C., or if the oil will bear heating to a higher temperature without undesirable discoloration then the temperature may be raised somewhat higher and hydrogen is contacted with the mixture as by bubbling the gas through a body of same. Decomposition of the said nickel compound ensues and catalytic material forms resulting in due course in the addition of hydrogen to the unsaturated bodies with which the thus-formed catalyzer may come into contact.

In the accompanying diagrammatic drawings, an illustrative form of treating apparatus which may be employed hereunder is shown in elevation with a portion of one tower shown in section. In the drawing 1 and 2 are containers or towers of considerable height. These towers may if desired be packed with granular material of a non-metallic nature, such for example, as granules of charcoal, or if desired, with non-metallic material carrying or retaining a metallic catalyzer, the non-metallic material being active or inactive as the case may be. The towers have baffles in some cases and as shown at 3, the baffles have a lip which allows the gases to collect at the other side of the baffles to form gas-pockets. 4 is the outlet for the gas discharging at 1, and this gas may be carried back to the tower 2 and travel through the system in a cyclic path preferably after having been washed. The oil enters at the inlet 5. 6 is a pressure gage. The tanks 1 and 2 are shown heated by steam coils through which superheated steam may be passed. A pipe 7 leads from the lower part of the tower 1 to the upper part of the tower 2 and serves to convey hydrogen gas from the latter to the former. An oil main runs from the top of the tank 2 to the bottom of the tank 1. Hydrogen is generated in the electrolytic cell, 22 and is forced by the pump 21 into the purifiers 19 and 17, then passes into the tower 2 moves upwardly therethrough and then is forced into the tower 1 where it travels upwardly in the same manner coming in intimate contact with the oil which is flowing in the opposite direction and being heated and if needful compressed to the point required for the most effective reaction. Finally any residual gases discharging at 4 may be taken back to the pump 21 and used again in the system in so far as they may contain any useful hydrogen content.

The oil entering at 5 with or without a colloidal or finely divided catalyzer is forced downwardly through the tower 1 and then forced into the tower 2 under a pressure sufficient to enable the oil to move freely against the pressure of the hydrogen gas.

The oil discharging from the bottom of the tower 2 is usually fully treated, that is to say, has been given the requisite addition of hydrogen, but this depends of course, on the height of the towers and the pressure and other circumstances, so that in case the oil is not sufficiently treated by one passage through the apparatus it may be passed through a second time, or as many times as desired through the tower.

A composite catalyzer system may be employed, as for instance, in that one tower or one portion of the tower a metallic catalyzer such as nickel may be employed; while in another tower or in some portion of the same tower, a catalyzer such as platinum or palladium may be used. Or it may be found useful under certain conditions to have a metallic catalyzer for one stage of the hydrogenation and a non-metallic catalyzer for another stage of the operation and this may be accomplished, for example, by layers of catalyzers usually placed either in the same tower or situated or maintained in separate towers.

It should, however, be understood that the foregoing description of apparatus and the procedure therewith is set forth purely for illustrative purposes and that the essence of the present invention prescribes no limitations respecting the means suited for the carrying out thereof.

The treatment of oil containing colloidal catalyst in the condition of a fog is not specifically claimed herein, the same being claimed in my copending application 57,094 filed Oct. 21, 1915. The circulation and reuse of the unabsorbed hydrogen, after treatment of oil and catalyst therewith is not claimed herein, but in the application above specified and in my copending application 695,206 filed May 4, 1912 and in my copending application 75,769 filed Feb. 2, 1916. The use of silicon-containing catalyst as herein described is not claimed herein, but in my copending application 873,507 filed Nov. 23, 1914. The colloidal catalyst and the preparation of the same are not claimed herein but in my copending applications 50,462 filed Sept. 13, 1915 and 89,093 filed Apr. 5, 1916. The hydrogenation of the unsaturated constituents with a catalyst at particularly described temperatures capable of producing stated effects is claimed in my copending applications 84,698 filed March 16, 1916 and 86,522 filed March 24, 1916.

What I claim is:

1. In the process of hydrogenating oily material and the like the step which comprises developing a finely divided catalyzer in a body of non-aqueous menstruum in liquid condition and in contacting said material with a hydrogen-containing gas in the presence of said catalyzer.

2. In the process of hydrogenating oily material and the like the step which comprises developing a finely divided catalyzer in an oily body in a liquid condition and in contacting said material with a hydrogen-containing gas in the presence of said catalyzer.

3. In the process of hydrogenating oily material and the like the step which comprises forming a finely divided catalyzer by thermal decomposition in an oily body in a liquid condition and in contacting said material with a hydrogen-containing gas in the presence of said catalyzer.

4. In the process of hydrogenating oily material and the like the step which comprises forming a finely-divided catalyzer by thermal decomposition of a non-volatile decomposable nickel body in an oily body and in contacting said material with a hydrogen-containing gas in the presence of said catalyzer.

5. In the process of hydrogenating oily material and the like the step which comprises forming a finely-divided catalyzer by thermal decomposition of a decomposable nickel salt in an oily body and in contacting said material with a hydrogen-containing gas in the presence of said catalyzer.

6. In the process of hydrogenating oily material and the like the step which comprises forming a finely-divided catalyzer by thermal decomposition of a decomposable organic nickel salt in an oily body and in contacting said material with a hydrogen-containing gas in the presence of said catalyzer.

7. In the process of hydrogenating oily material and the like the step which comprises forming a finely-divided catalyzer by thermal decomposition of a decomposable nickel salt of a fatty acid in an oily body and in contacting said material with a hydrogen-containing gas in the presence of said catalyzer.

8. In the process of hydrogenating oily material and the like the step which comprises forming a finely-divided catalyzer by thermal decomposition of nickel oleate in an oily body and in contacting said material with a hydrogen-containing gas in the presence of said catalyzer.

9. In the process of hydrogenating fatty material containing unsaturated bodies the step which comprises forming a finely-divided catalyzer by thermal decomposition of a potential catalyst comprising a decomposable organic salt of a heavy metal in a liquid medium and in contacting said fatty material with a hydrogen-containing gas in the presence of said catalyzer.

10. In the process of hydrogenating oily material and the like the step which comprises forming a finely-divided catalyzer by thermal decomposition of a decomposable nickel salt and in contacting said material with a hydrogen-containing gas in the presence of said catalyzer.

11. In the process of hydrogenating oily material and the like the step which comprises forming a finely-divided catalyzer by thermal decomposition of a decomposable organic nickel salt and in contacting said material with a hydrogen-containing gas in the presence of said catalyzer.

12. In the process of hydrogenating oily material and the like the step which comprises forming a finely-divided catalyzer by thermal decomposition of a decomposable nickel salt of a fatty acid and in contacting said material with a hydrogen-containing gas in the presence of said catalyzer.

13. In the process of hydrogenating oily material and the like the step which comprises forming a finely-divided catalyzer by thermal decomposition of nickel oleate and in contacting said material with a hydrogen-containing gas in the presence of said catalyzer.

14. In the process of hydrogenating fatty material containing unsaturated bodies the step which comprises forming a finely-divided catalyzer by thermal decomposition of a potential catalyst comprising a decomposable organic salt of a heavy metal and in contacting said fatty material with a hydrogen-containing gas in the presence of said catalyzer.

15. In the process of hydrogenating oily material and the like the step which comprises heating a metal-containing material to a decomposing temperature in the presence of a non-aqueous menstruum and in contacting some portion at least of the products of such decomposition with said oily material in the presence of a hydrogen-containing gas.

16. In the process of hydrogenating oily material and the like the step which comprises heating nickel-containing material to a decomposing temperature in the presence of a non-aqueous menstruum and in contacting some portion at least of the products of such decomposition with said oily material in the presence of a hydrogen-containing gas.

17. In the process of hydrogenating oily material and the like the step which comprises heating a compound comprising a metallic body united to an organic radical to a decomposing temperature in the presence of a non-aqueous menstruum and in contacting some portion at least of the products of such decomposition with said oily material in the presence of a hydrogen-containing gas.

18. In the process of hydrogenating oily material and the like the step which comprises heating a compound comprising a base metal united to an organic radical to a decomposing temperature in the presence of a non-aqueous menstruum and in contacting some portion at least of the products of such decomposition with said oily material in the presence of a hydrogen-containing gas.

19. In the presence of hydrogenating oily material and the like the step which comprises heating nickel united to an organic radical to a decomposing temperature in the presence of a non-aqueous menstruum and in contacting some portion at least of the products of such decomposition with said oily material in the presence of a hydrogen-containing gas.

20. In the process of hydrogenating oily material and the like the step which comprises forming a colloidal catalyzer in an oily body in a liquid condition and in contacting said material with a hydrogen-containing gas in the presence of said catalyzer.

21. In the process of hydrogenating oily material and the like the step which comprises forming a finely divided colloidal catalyzer in a body of non-aqueous menstruum in a liquid condition and in contacting said material with a hydrogen-containing gas in the presence of said catalyzer.

22. In the process of hydrogenating oils and the like the step which consists in subjecting an unsaturated oil to hydrogen in the presence of a colloidal catalyzer.

23. In the process of hydrogenating oils and the like the step which consists in subjecting an unsaturated oil to hydrogen in the presence of a catalyzer formed in said unsaturated oil.

24. The process of treating unsaturated oils which comprises subjecting same at a temperature of at least 150° C. to the action of hydrogen in the presence of a colloidal catalyzer.

25. The process of treating organic material containing unsaturated bodies which comprises passing said material through a bed of fragmental material in the presence of a colloidal catalyzer and a hydrogen-containing gas.

26. The process of hardening oils, which comprises treating the oil with a suitable metallic salt and in the presence of hydrogen, said metallic salt being soluble in the oil treated.

27. The process of hardening oils, which comprises treating the oil with a metallic salt of the product treated in the presence of hydrogen.

28. The process for the reduction of organic compounds by a reducing gas and by catalysis, which consists in treating such a compound with an organic metal salt and a reducing gas, substantially as described.

29. The process for the reduction of organic compounds by hydrogen and by catalysis, which consists in treating such a compound with an organic metal salt and hydrogen, substantially as described.

30. The process for the reduction of organic compounds by gas mixtures containing hydrogen and by catalysis, which consists in treating such a compound with an organic metal salt, and gas mixtures containing hydrogen, substantially as described.

31. The process for the reduction of fatty acids by a reducing gas and by catalysis, which consists in treating such an acid with an organic metal salt and a reducing gas, substantially as described.

32. The process for the reduction of glycerids of fatty acids by a reducing gas and by catalysis, which consists in treating such a compound with an organic metal salt and a reducing gas, substantially as described.

33. In the process of hydrogenating oils and the like, the step which consists in subjecting oily material containing, as natural constituents, unsaturated bodies to the action of hydrogen in the presence of a colloidal catalyzer, while said oily material is maintaining at a temperature between the approximate limits of 150 and 200° C.

34. In the process of hydrogenating oils and the like, the step which consists in subjecting oily material containing, as natural constituents, unsaturated bodies to hydrogen in the presence of a catalyst comprising colloidal nickel, while said oily material is maintained at a temperature of about 170° C.

Signed at Montclair in the county of Essex and State of New Jersey this 28th day of March A. D. 1912.

CARLETON ELLIS.

Witnesses:
THOMAS F. ROCHE,
HENRY F. MULLER.